United States Patent [19]

Hartley et al.

[11] 4,316,246

[45] Feb. 16, 1982

[54] BATTERY SWITCHING APPARATUS INCLUDED WITHIN A TIMER ADAPTER UNIT

[75] Inventors: Henry F. Hartley, Lowell; Ralph G. Schuberth, Bedford, both of Mass.

[73] Assignee: Honeywell Information Systems Inc., Waltham, Mass.

[21] Appl. No.: 73,057

[22] Filed: Sep. 6, 1979

[51] Int. Cl.³ ............................................... G06F 1/00
[52] U.S. Cl. .................................................. 364/200
[58] Field of Search ... 364/200 MS File, 900 MS File; 307/23, 48, 49, 64, 66, 126, 130; 365/229, 226, 227; 371/66; 339/19, 32 R, 32 M

[56] References Cited

U.S. PATENT DOCUMENTS

| | | | |
|---|---|---|---|
| 3,859,638 | 1/1975 | Hume, Jr. ........................... | 365/229 |
| 3,956,740 | 5/1976 | Jones et al. ........................ | 364/900 |
| 4,143,283 | 3/1979 | Graf et al. ......................... | 364/900 |

*Primary Examiner*—Gareth D. Shaw
*Assistant Examiner*—Thomas M. Heckler
*Attorney, Agent, or Firm*—Faith F. Driscoll; Nicholas Prasinos

[57] ABSTRACT

An adapter includes free running low power clock circuits connected to provide a time of day value accessible by a central processing unit which couples to the adapter through a controller subsystem. The adapter cicuits are constructed on a circuit board which is installed as part of the controller subsystem. The clock circuits are connected to one terminal of a battery power supply whose other terminal connects to an interface connector included within the adapter. Upon installing the adapter board in the subsystem, the battery power supply is connected to provide power for operating the clock circuits. When the adapter is removed from the subsystem, the battery power supply is disconnected, preventing it from discharging. The adapter includes an adapter connector for connecting the output terminal of the battery power supply to enable the battery to be charged or its power level monitored when the adapter circuit board is installed.

23 Claims, 6 Drawing Figures

BATTERY SWITCHING APPARATUS INCLUDED WITHIN A TIMER ADAPTER UNIT

BACKGROUND OF THE INVENTION

1. Field of Use

This invention relates to time of day clock circuits and more particularly to apparatus for powering such circuits.

2. Prior Art

Battery operated portable microcomputer systems are well known. One such system is described in the article "Design Techniques for Microprocessor Memory Systems" by A. Thampy Thomas published in the August 1975 issue of the publication "Computer Design". Such systems include a non volatile memory system constructed from CMOS memories which have extremely low standby power dissipation in addition to a standby rechargeable battery with a diode to keep the battery from discharging into the turned off power line.

Additionally, similar battery arrangements have been used as backup power sources in minicomputer systems for providing auxiliary power in the event of power failures. When battery arrangements are included in timer devices, they have given such devices the same feature of portability. In such arrangements, the timer devices operate as free standing units rather than being integrated into a computer system.

Accordingly, it is a primary object of the present invention to provide an improved time of day device.

It is a further object of the present invention to provide a time of day device which can be easily integrated into a data processing system.

SUMMARY OF THE INVENTION

These objects are achieved in a preferred embodiment of the adapter of the present invention.

The adapter circuits are constructed on a single integrated circuit board which is installed as part of a device controller subsystem. The adapter circuits include free running very low power clock circuits connected to provide time of day values which are accessible by a central processing unit which couples to the device controller. The adapter board further includes a number of series connected rechargeable button battery cells connected to form a voltage supply. One terminal of the voltage supply connects to the clock circuits and the other terminal is connected to one pin of a controller/adapter interface connector included on the adapter board.

Only when the adapter board is installed into the controller subsystem is the battery supply connected as a voltage source for powering the clock circuits in the absence of AC power. This occurs when the system is powered down or during failures. The arrangement maintains an accurate time of day value in such situations. This eliminates the central processing unit from having to expend processing time in loading such clock circuits with a time of day value.

More importantly, when the adapter board is not installed in the system, the arrangement of the invention automatically disables the battery supply. Therefore, no battery power is expended for the period of time the board is not in use. This has the advantage of extending the shelf life of the batteries and reduces the number of times the battery supply must be recharged. Moreover, when the adapter board is later installed, the central processing unit initialization routine loads the clock circuits with a time of day value.

Also, in accordance with the present invention, the adapter board includes another connector which connects the output terminal of the battery supply. This enables the battery supply current voltage level to be monitored and the battery recharged when the adapter board is installed into the controller subsystem.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

DESCRIPTION OF THE PREFERRED EMBODIMENT

Figure 1:
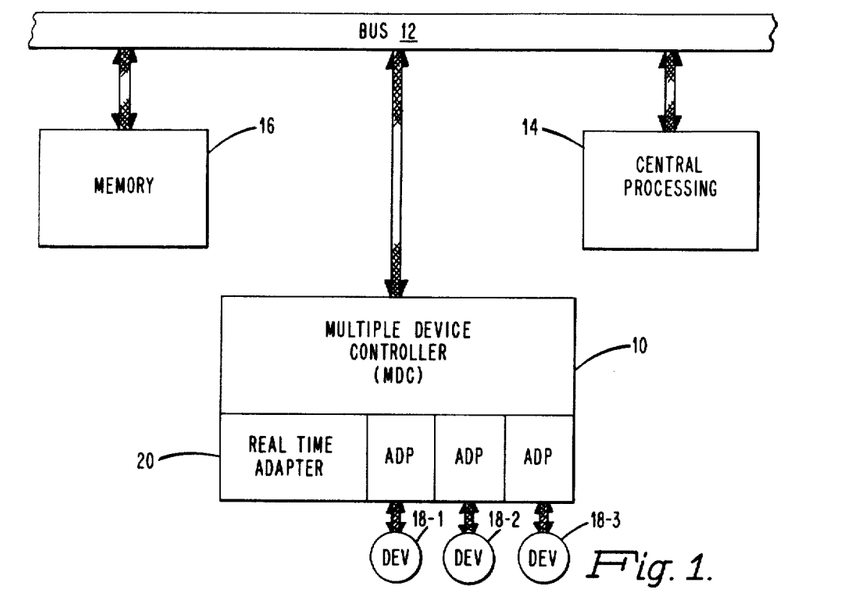
FIG. 1 is a block diagram of a data processing system which incorporates the apparatus of the present invention.

FIG. 1 is a block diagram of the system in which the real time adapter of the present invention is to be utilized. As seen from the figure, the system includes a central processing unit 14, a memory unit 16 and a multiple device controller 10 each of which couple to a bus 12. The controller 14 may for example service up to four devices through different ones of the adapter units 20. One of the adapters corresponds to the real time adapter of the present invention while the others connect to different ones of the devices 18-1 through 18-3 as shown. The controller 10 may take the form of the microprogrammable controller disclosed in U.S. Pat. No. 4,025,906 issued May 24, 1977 and which is assigned to the same assignee as named herein.

GENERAL DESCRIPTION OF PREFERRED EMBODIMENT OF ADAPTER 20

Figure 2:
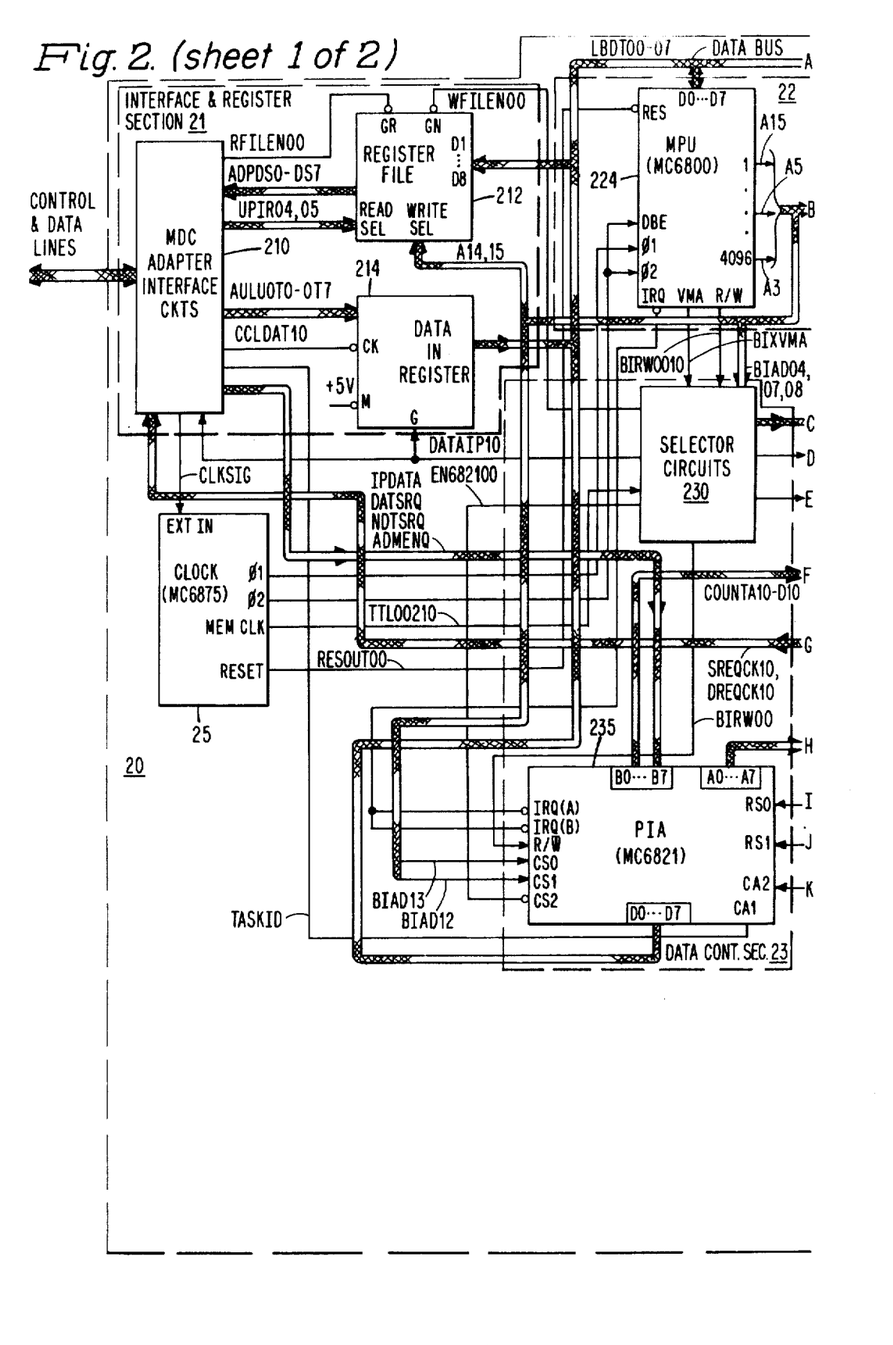
FIG. 2 is a block diagram of the adapter which incorporates the apparatus of the present invention.

FIG. 2 discloses in block diagram form the real time adapter 20 of the present invention. Referring to the figure, it is seen that the major sections of the adapter 200 include an interface and register section 21, MPU section 22, a data control section 23, a time of day counter 24, and a clock circuit section 25. The interface and register section 21 under control of the microprocessor section 22 transfers time of day data and status information, and interrupt signals to the MDC 10. It also receives and stores data and control information transferred from MDC 10.

Register Section 21

As shown, section 21 includes the control logic circuits of block 210, a register file 212 and an eight bit data-in register 214 connected to the lines of interface 15 and the internal address and data busses of section 22 as shown. The units of section 21 also receive control and enabling signals from sections 23 and 24. The interface circuits 210 provide control signals (i.e. DATSRQ-IPDATA) as inputs to sections 23 and 24.

The register file 212 is constructed from a pair of 4 by 4 register files with tristate outputs. Each file is organized as 4 words of 4 bits and includes separate read-/write addressing for simultaneous reading and writing. The files are constructed from SN74LS670 register file chips manufactured by Texas Instruments Inc. and are described in the publication "*The TTL Data Book for Design Engineers*", Copyright 1976 by Texas Instruments. The data-in register 214 is constructed from a pair of 4 bit register circuits with tristate outputs such as SN74LS295 manufactured by Texas Instruments Inc.

Section 22

The microprocessor section 22 includes a microprocessor (MPU) 224 and associated random access memory (RAM) 226 and programmable read only memory (PROM) 228. The units 224, 226 and 228 connect to the internal data and address busses of section 22 as shown. The MPU 224 corresponds to the MC6800 microprocessor unit manufactured by Motorola Inc. which is described in the publication "*Basic Microprocessors and the 6800*", by Ron Bishop, Copyright 1979 by Hayden Book Company Inc. and in U.S. Pat. No. 3,962,682. The various descriptions of this microprocessor unit and other units are incorporated by reference to the extent necessary for an understanding of the present invention. Briefly, the MPU 224 is an 8-bit processor which executes instructions within a minimum execution time of 2 microseconds. The processor addresses the units which connect to it via certain ones of the lines A0-A15 of the 16-bit address bus and transfers data over the lines D0-D7 of an 8-bit bidirectional data bus at a one megahertz clock rate established by the clock signals from the circuits of section 25. The MPU 224 includes two, 8-bit accumulators (A, B), a 16-bit index register (IR), a 16-bit stack pointer register (SP), a 16-bit program counter (PA), and an 8-bit condition code register (CC). The two, 8-bit accumulators are used to store the operands and the results generated by an arithmetic and logic unit (ALU) included therein.

The index register stores memory address for an index mode of memory addressing while the stack pointer register stores the next address of a next available location in an external push-down-pop-up stack included within a section of RAM 226 of FIG. 2. The program counter stores the program address and condition code register stores 6 bits of condition codes indicating the result of an ALU operation. These bits are tested by MPU 224 to detect the presence of certain conditions via conditional branch instructions.

As seen from FIG. 2, the control lines of MPU 224 include: a reset ($\overline{RES}$) line which automatically resets the processor enabling it to begin an initialize routine for start-up, a data bus enable (DBE) line for enabling the data bus driver circuits, phase one ($\phi1$) and phase two ($\phi2$) clock lines which are connected to receive clocking signals from section 25, a valid memory address (VMA) line for indicating when a valid address has been applied to the address bus, and an interrupt request line ($\overline{IRQ}$) which signals the presence of an interrupt request.

The RAM 226 and PROM 228 which comprise the memory system of MPU 224 are shown in FIG. 2. The RAM 226 includes 1024 (1K) 8-bit locations and is constructed from a pair of 1024×4-bit RAM memory chips with tristate outputs such as those designated as the 2114 manufactured by Intel Corporation. The RAM is divided into the four register sections.

The PROM 228 also includes 2048 locations and is constructed from a pair of 2048×4 bipolar PROM tristate controlled chips designated as 82S185 manufactured by Signetics Corporation and described in the publication "Signetics Bipolar & MOS Memory Data Manual", printed January, 1979. The PROM is divided into the four sections. Each section stores the different ROM routines required for adapter operation as explained herein.

As seen from FIG. 2, the RAM 226 is enabled for writing operation when section 23 forces a chip select (CS) and write enable (WE) terminals to binary ZEROS. An 8-bit address is applied via lines A15–A8 to the first 8 address input terminals of the RAM for read out or write in of an 8-bit word applied to the chips I/O lines 1–8. An 11-bit address is applied via the lines A15–A5 to the address input terminals of the PROM while signal CPROM 100 is applied to an enabling line $\overline{CE}$ for read out of an 8-bit instruction word on lines 01–08 from the specified location. As explained herein, signal CPROM100 is generated in accordance with the state of the address signal applied to the A4 line of the address bus.

Data Control Section 23

The data control section 23 includes the selector circuits of block 230 and a peripheral interface adapter (PIA) circuit 235. The selector circuits 230 receive address input signals from the address bus of section 22 and a memory clock signal TTL00210 from section 25. The circuits 230 are operative to generate a number of control enabling signals which are distributed to the different sections as shown. The PIA circuit 235 connects to MPU 224 via the data bus through lines D0–D7 and includes two separate sets of 8-bit bidirectional interface lines. Certain ones of interface lines PB0–PB3 apply signals COUNTA10-D10 to section 24 while the remaining lines PB4–PB7 are connected to receive signals DATSRQ10 through IPDATA10 generated by the interface circuits of block 210. The interface lines PA0–PA7 are connected to apply signals APIA00-10-0710 to section 24.

The PIA circuit 235 is a MC6821 PIA circuit manufactured by Motorola Inc. and is described in detail in the above-referenced publication as well as in U.S. Pat. No. 4,145,751 issued Mar. 20, 1979. Each set of interface lines of the PIA circuit 235 includes a peripheral data register, a data direction register and a control register. The peripheral data register serves as an interface register while the data direction register is used to control the direction of data transfer.

As seen from FIG. 2, the circuit 235 also includes the following control lines: chip select lines CS0, CS1 and line $\overline{CS2}$ which receive address signals BIAD1310, BIAD1210 from MPU 223 and an enabling signal EN682100 from the circuits of block 230, an enable line which is connected to receive a timing signal TTL00210 from section 25, a read/write line (R/W) which is connected to receive a signal BIRW00 from the circuits of block 230 used for specifying the direction of transfers on the data bus, a pair of interrupt request lines. $\overline{IRQA}$ and $\overline{IRQB}$, for applying interrupt requests to MPU 224, a pair of interrupt input lines, CA1 and CB1, which are used to set interrupt indications within the PIA control registers, a pair of peripheral control lines, CA2, CB2, each line being used as either an external interrupt input line or peripheral output line as a function of the contents of the control register associated therewith and a pair of register select lines, RS0, RS1, which are connected to receive address signals BIAD1510 and BIAD1410 from the address bus. These lines in conjunction with the control registers select the particular register within PIA 235 that is to be written into or read out. The PIA circuit 235 is enabled for operation when MPU 224 forces lines CS0 and CS1 to binary ONES and line CS2 to a binary ZERO.

Time of Day Counter Section 24

The time of day counter section 24 includes a 48-bit time of day counter 248 which couples a one kilohertz crystal controlled clock circuit of block 249, a 48-bit latch register 246, a plurality of inverter-driver circuits of blocks 242, 244 and 246 and the data selector circuits of block 241 connected as shown. The time of day counter 248 includes 12, 4 bit counter chip circuits connected in series to form a 48-bit counter. As discussed herein, the counters are constructed from the 4 bit binary counters designated as MC 14526B, manufactured by Motorola Inc. The 48-bit latch register 246 includes eight 8 bit shift registers which connect in parallel as explained herein. The shift registers are constructed from 9-bit static shift registers designated as MC 14021B manufactured by Motorola Inc.

The one megahertz clock circuit of block 249 include a 16 kilohertz crystal controlled oscillator 2492 which generates a 16 KHZ square wave timing signal, a series coupled divide by 16 count down counter circuit 249-1 which divides the 16 KHZ signal to a 1 KHZ timing signal and a series connected NAND gate 249-0 which applies an inverted 1 KHZ square wave signal to the input of counter 248. The 1 KHZ square wave signal decrements the time of day counter 248 at a one millisecond rate when an inhibit clock signal CNTINH10 applied to an inhibit input terminal is at a binary ZERO. The input terminal is connected to ground via a 1.2 kilohm resistor as shown thereby enabling the counter 248.

As seen from FIG. 2, the counter 248 receives data input signals from PIA235 via the inverter/driver circuits 242. The inverter/driver circuits 244 are connected to apply a plurality of loading signals LDCNTU-Z to counter 48 which are generated by the data selector circuits of block 241. The output signals TIME00-07 through TIME50-57 from counter 48 are applied as inputs to 48-bit latch register 246 which is connected to receive a latch control command signal LATCH10 from the circuits 241 and an enabling control signal WDENBL00 from selector circuits 230. The output signals DBIT00-07 from different stages of the shift registers of latch register 246 are, in turn, applied to the data bus via the inverter-driver circuits of block 247 when the circuits are enabled by signal WDENBL00. Each of the inverter-driver circuits of blocks 242, 244 and 247 are constructed from inverted data output driver circuits with tristate outputs designated as SN74368 manufactured by Texas Instruments Inc.

Section 25

The section 25 includes the clock circuits which are constructed from the MC6875 clock chip manufactured by Motorola Inc. The chip in response to the clocking signal CLKSIG10 applied to its input EXTIN, generates two phase nonoverlapping phase 1 and phase 2 clock signals on the $\phi1$ and $\phi2$ output lines in addition to a separate $\phi2$TTL output signal which is applied at the MEMCLK output. The $\phi1$ and $\phi2$ clocking signals synchronize MPU operations in the following manner. During normal operation, when the phase 1 ($\phi1$) clock signal is forced to a binary ONE, the contents of the MPU program counter are applied to the address bus. At this time, the VMA line switches to a ONE indicating a valid address. On the trailing edge of the $\phi1$ clock signal, the program counter contents are incremented by one. When the $\phi2$ clock signal is a binary ONE, the data from the addressed memory location is placed on the data bus and during the trailing edge of the $\phi2$ signal, the data is latched into MPU 224. This sequence of operations occur within the MPU 224 each time the MPU addresses a memory location and transfers the data contents to a register within the MPU.

DETAILED DESCRIPTION OF ADAPTER SECTIONS OF PRESENT INVENTION

The different ones of the sections of FIG. 1 pertinent to an understanding of the present invention will now be described in greater detail with reference to FIGS. 3a and 3b. Before describing these sections, reference is first made to FIG. 4. This figure shows the three adapter/MDC interface connectors and one adapter configuration connector included as part of adapter 20. The connectors Z01, Z03 and Z04 connect the interface lines between MDC10 and adapter 20 to the different circuits of adapter 20.

A description of only the interface lines pertinent to the present invention is given in greater detail in the section to follow.

| DESIGNATION | DESCRIPTION |
|---|---|
| MZGNDO | This zero ground line extends from adapter 20 to MDC10. It provides a ground return for the battery back-up supply mounted on the adapter. |
| ZGND | This zero ground line extends from MDC10 to adapter 20. It provides a ground or zero volts reference for adapter 20. |
| ZVP05 | This +5VDC line extends from MDC10 to adapter 20. It provides a +5VDC voltage supply for adapter 20. |

For further details regarding the interface lines between the adapter 20 and controller 10, reference may be made to the copending patent application of Boyd E. Darden titled "A Real Time Adapter Unit for Use in a Data Processing System", Ser. No. 73,058, filed on even date and assigned to the same assignee as named herein.

The adapter configuration connector includes a number of input terminals which can be used to control the operations of adapter 20. However, only those lines pertinent to an explanation of the present invention are described herein.

| DESIGNATION | DESCRIPTION |
|---|---|
| BV3P6V | This battery voltage line is used to connect adapter 20 to an external device. From this point, the current/voltage level of the adapter battery which should be at a 3.6 volt minimum can be monitored. |
| ZVP05-VAA | This 5 VDC line is used to connect adapter 20 to an external supply for recharging the adapter battery when the |

| DESIGNATION | DESCRIPTION |
| --- | --- |
| | adapter 20 has been removed from the MDC. |

TIME OF DAY COUNTER CIRCUITS

Figure 3A:
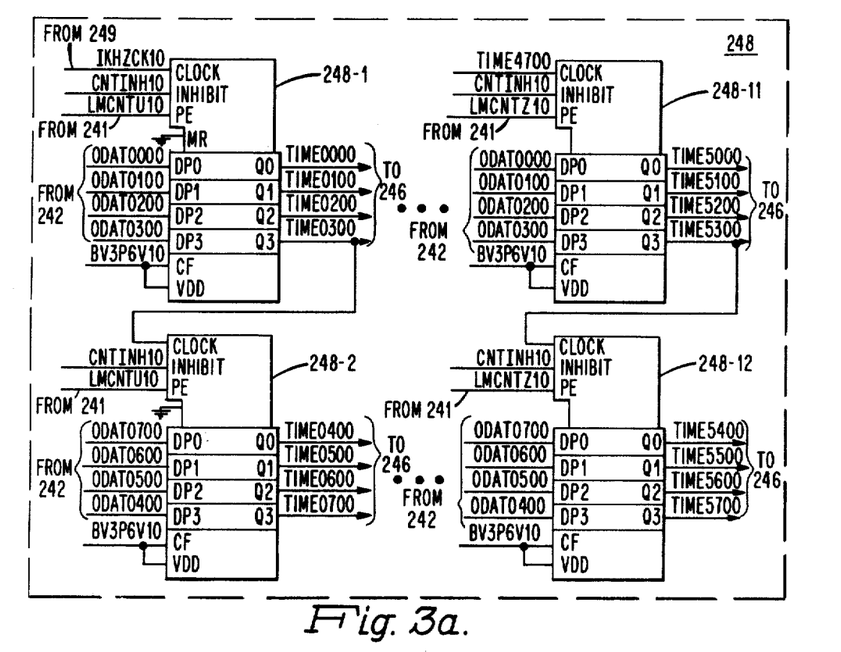
FIGS. 3a through 3c show in greater detail the clock circuits of FIG. 1.

FIG. 3a shows in greater detail several of the twelve time of day counter circuits 248-1 through 248-12 of block 248. Each of the counter circuits 248-1 through 248-12 connect to the ODAT00-07 lines for loading different ones of the sets of byte signals transferred from MDC10. For example, it is seen that counter circuits 248-1 and 248-2 connect in series and store the least significant byte. The most significant byte is stored by series connected counter circuits 248-11 and 248-12.

The clock pulse signal 1KHZCK10 is applied from the oscillator circuits of block 249 and goes positive every millisecond. This signal causes a count of one to be added to the low order bit position of counter circuit 248-1 every millisecond effective in incrementing the time of day count by one as long as inhibit signal CNTINH10 is a binary ZERO. The signal CNTINH10 is applied through a 1.2 kilohm resistor which connects to a ground reference voltage.

It will be noted that the voltage signal BV3P6V10 is applied to the CF terminals of each of the counter circuits 248-1 through 248-12. This enables pulse counting operation to proceed with no additional gates required as explained herein.

Each of the counter circuits 248-1 through 248-12 are connected to a 3.6 V DC battery supply voltage through VDD terminal 16 and to a zero reference voltage through VSS terminal 8.

Figure 3B:
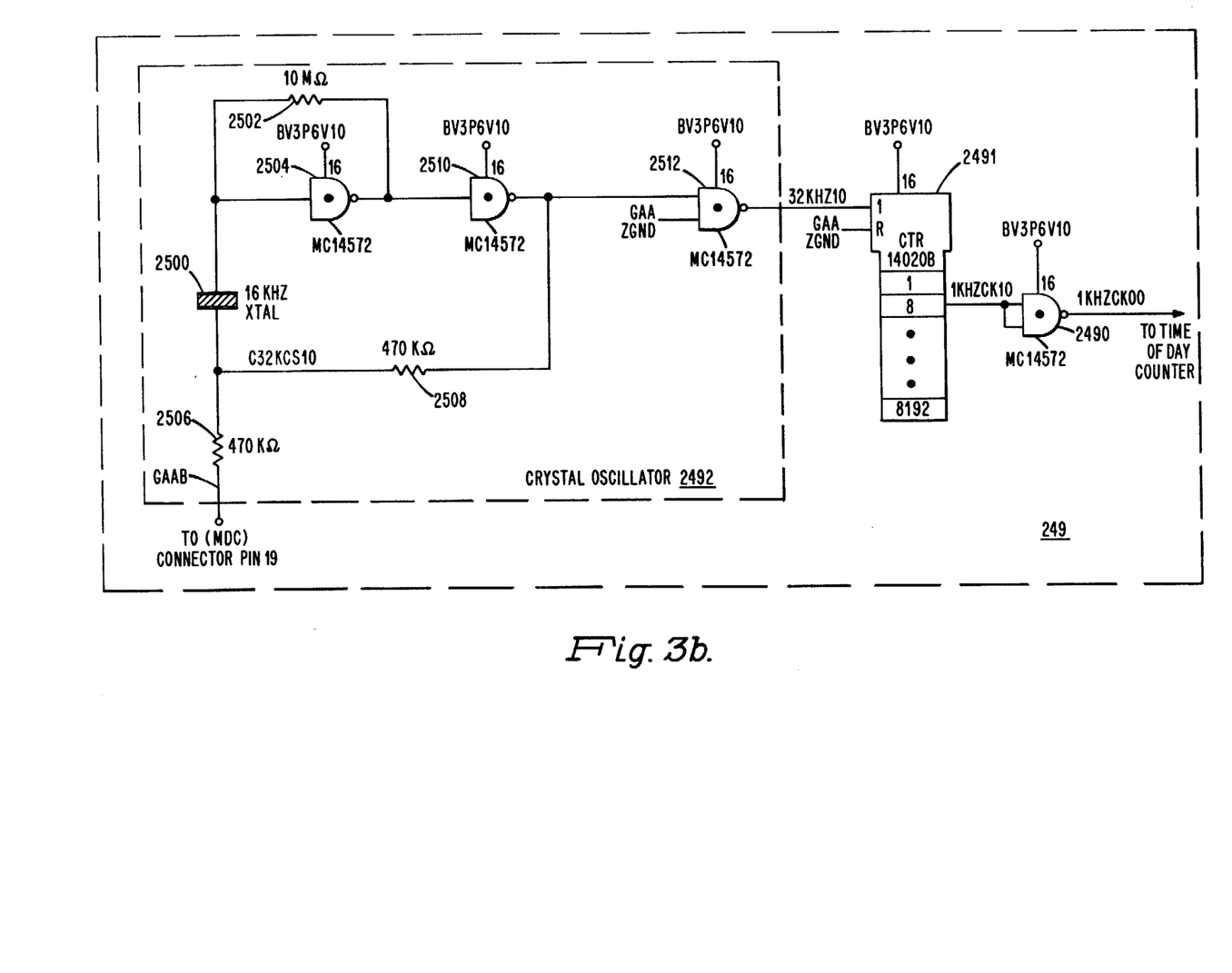

FIG. 3b shows in greater detail the oscillator circuits of block 249. It is seen that the 16 kilohertz crystal oscillator circuit 2492 includes a 16 kilohertz crystal 2500 which connects at one end in common with one end of a 10 megohm feedback resistor 2502 and input terminal of a NAND gate 2504. The other end of crystal 2500 connects in common with two 470 kilohm resistors 2506 and 2508. The other end of resistor 2506 connects to a ground reference potential through connector Z01 of FIG. 3. The output of NAND gate 2505 is inverted by a NAND gate 2510 and feed back to crystal 2500. The output of the oscillator appearing at NAND gate 2510 is applied to the divide by 16 counter 2491 through a NAND gate 2510. The other terminal of the NAND gate 2512 The other terminal of the NAND gate 2512 connects to ground.

As seen from FIG. 3b, each of the NAND gates 2504, 2510, 2512 and 2490 and the counter circuit 2491 connect to the power supply voltage B3P6V10. As explained herein, the supply voltage ZVP05 is normally provided by MDC10 except during a power down condition. In this case, power is furnished by the battery arrangement shown in FIG. 3c.

Figure 3C:
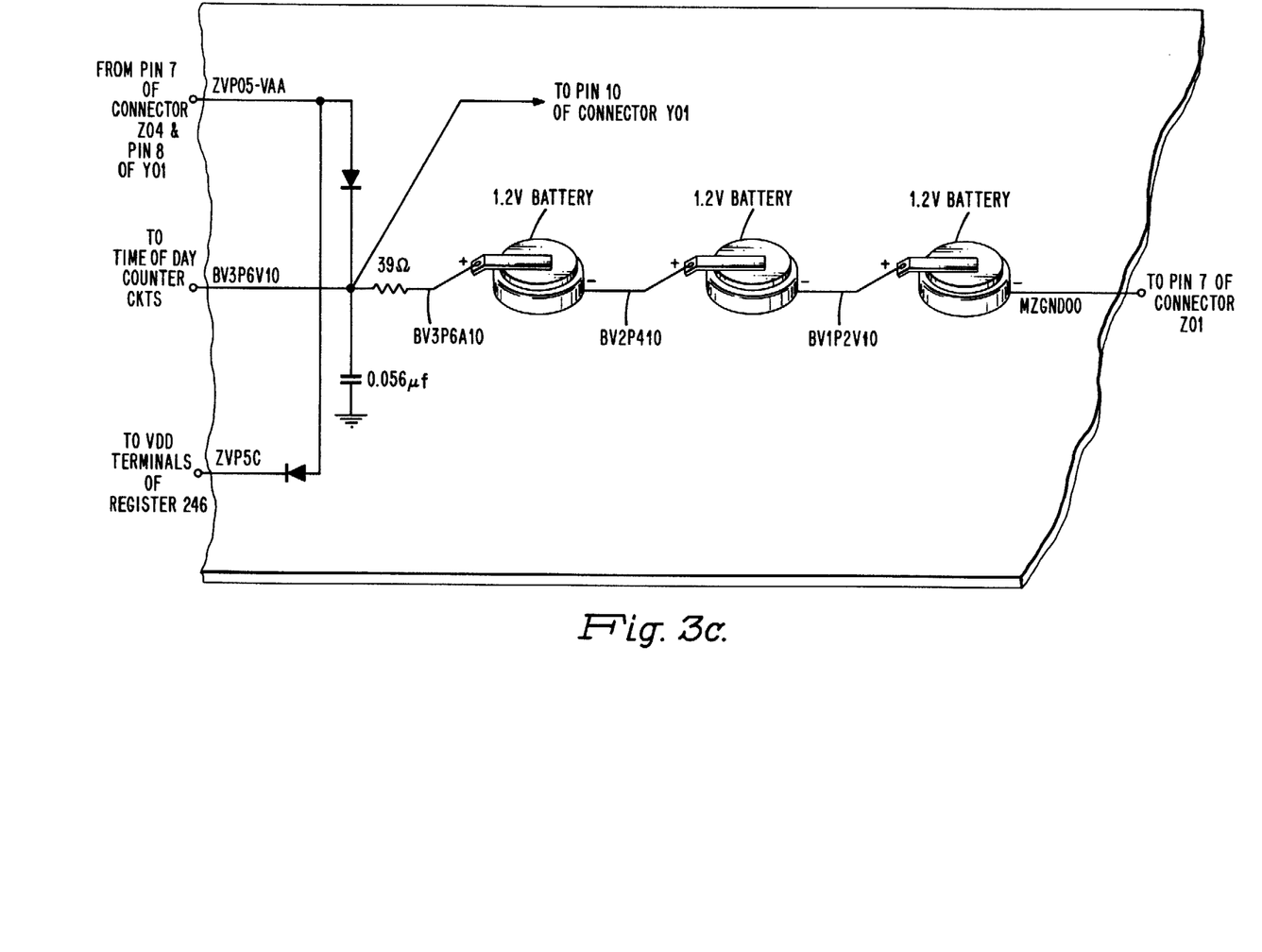

Referring to FIG. 3c, it is seen that the adapter battery supply comprises three 1.2 volt button batteries connected in series. These batteries may take the form of cylindrical button case nickel cadmium batteries and may be considered conventional in design.

Figure 4:
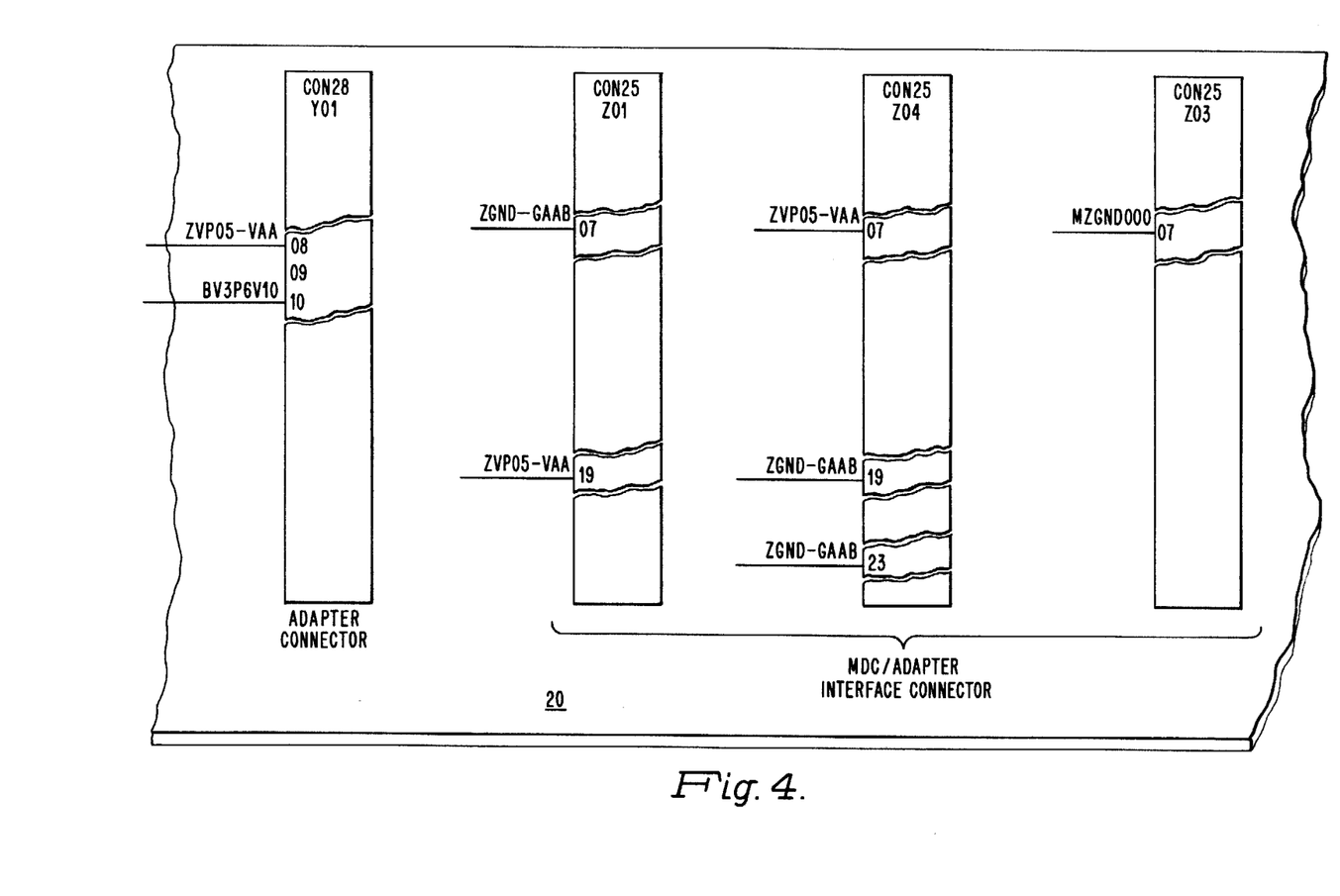
FIG. 4 shows the connector arrangement which forms part of the apparatus of the present invention.

The negative terminal of the first battery which corresponds to ground zero voltage signal NZGND00 connects to terminal 7 of connector Z03 of FIG. 4. The positive terminal of the last battery which corresponds to signal BVP6A10 connects through a 39 ohm resistor and 0.056 uf capacitor network to the CF terminals of each of the counter circuits 248-1 through 248-12.

Additionally, the same point connects to pin 7 of connector Z04 via a diode which corresponds to the normal voltage source. Also, this point Y01 of FIG. 3 connects to pin 10 of adapter connector. As mentioned previously, the Y01 connector can be connected to an external device for monitoring the voltage level of the adapter battery.

When the battery voltage drops below the minimum value of 3.6 volts, the battery can be recharged by an external power source through pin 10 of connector Y01. The additional diode which connects between point ZVP05VAA and ZVP5C as shown eliminates any current from being drawn out of the battery by the MOS circuits of latch register 246 when normal power is off and the adapter board is installed in the subsystem.

DESCRIPTION OF OPERATION

With reference to FIGS. 1 through 4, the operation of the preferred embodiment of the adaptor 20 incorporating the apparatus of the present invention will now be described. When the adapter board is installed into the subsystem of MDC 10, the interface connectors Z01, Z03 and Z04 of FIG. 4 are connected to the MDC controller board (i.e. mother board). As seen from FIGS. 3c and 4, this connects the negative terminal MZGND00 to ground potential of the MDC controller board via pin 7 of connector Z01. When normal power is on, the adapter board receives +5 volts supply voltage ZVP05VAA from the MDC controller board via pin 7 of connector Z04.

This +5 volts is in turn distributed to the VDD terminals of certain ones of the chips of the adapter board 20. In the case of the latch register 249 chips, the +5 volts supply voltage is applied to the VDD terminals as ZVP5C voltage through the second diode as shown in FIG. 3c. The supply voltage BV3P6V10 is applied to the time of day counter circuits of FIGS. 3a and 3b.

Once the adapter board 20 has been installed, CPU 14 as part of an initialize routine issues a command for loading the time of day counter 248 with a millisecond count referenced from the date Jan. 1, 1901 representative of the time of day. The MDC 10 in response to a function code command from CPU 14 transfers a task word command to adapter 20. This causes the MPU 224 to branch to a ROM load timer routine.

In response to a series instruction of this routine, the 6 8 bit bytes received from MDC10 are loaded by MPU 224 into the different stages 248-1 through 248-12 of time of day counter 248 a byte at a time. Once this task is completed CPU 14 can read the time of day value via command.

When the system of FIG. 1 is powered down, the adapter of the present invention maintains the updating of the time of day value through the arrangements of FIGS. 3a through 3c. This eliminates the need for having the CPU14 to expend time loading the new time of day value.

As seen from FIG. 3c, when the system is placed in the power down state, the +5 volt supply voltage ZVP05-VAA is now turned off. Thus, only the counter circuit of FIGS. 3a and 3b are powered by the battery supply voltage BV3P6V10.

As previously discussed, the counter circuits are constructed from complementary MOS circuits which are selected because of their low power dissipation qualities. The oscillator circuits are similarly constructed.

With such low power dissipation levels, the time of day counter is able to operate for considerably long periods of time. Additionally, the two diodes of FIG. 3c are connected to prevent any dissipation of battery power through low impedance sources during the period of time the +5 volt supply voltage ZVP05-VAA is off.

In a number of situations, it will be necessary to remove the adapter board from the system of FIG. 1 or have adapter boards on hand ready for installation. In accordance with the arrangement of the present invention, when the board is removed from the controller subsystem, the negative terminal MZGND00 no longer connects to the MDC controller board via pin 7 of connector Z01. This automatically prevents the battery of FIG. 3c from discharging for the period of time the adapter board is not installed. Accordingly, the storage life of the battery is prolonged. Prior to installation, the battery voltage can be checked off line through pin 10 of adapter connector Y01. When below the minimum voltage level, the battery can be charged by connecting a separate voltage source between pin 8 of adaptor connector Y01 and pin 7 of connector Z03 of FIG. 4.

When the adapter board is then installed, the CPU 14 can then access the adapter 20 via the MDC10 to load the time of day counter with an appropriate value as part of its initialization sequence. It will be appreciated that when installed, the arrangement of the present invention enables the monitoring of the battery power (charging or discharging) to be continued through pin 10 of adapter connector Y01.

From the foregoing, it is seen how the arrangement of the present invention is able to provide an adapter of a data processing system which can be battery powered for long periods of time and which eliminates expending of additional processing time. More importantly, the invention automatically prevents the dissipation of battery power by the adapter circuits for the interval of time the adapter is not installed and ready for use. Further, the invention facilitates the recharging and monitoring of battery supply voltage and current levels on and off line.

While in accordance with the provisions and statutes there has been illustrated and described the best form of the invention, certain changes may be made without departing from the spirit of the invention as set forth in the appended claims and that in some cases, certain features of the invention may be used to advantage wituout a corresponding use of other features.

What is claimed is:

1. A system including a controller subsystem having a number of circuits of an adapter mounted on a circuit board connectable to said controller subsystem, said adapter circuits comprising:
    a low power free running time of day counter circuit means for generating and storing time of day values;
    rechargeable battery circuit means connected to provide an auxiliary supply voltage, said battery circuit means having first and second output terminals, said first terminal being connected to supply said auxiliary supply voltage and said second terminal being connectable to a ground reference potential;
    connector means having a number of pins for interconnecting said controller subsystem and adapter for operation, a first pin being connected to said second terminal and a second pin being connectable to a supply voltage from said controller subsystem;
    circuit means connecting said second pin in common with said first terminal for powering said adapter circuits during normal operations; and,
    conductor means connecting said first terminal to said time of day counter circuit means, said battery circuits being enabled to power said time of day counter circuit means only upon connecting said adapter circuits into said controller subsystem and said battery circuits being disabled when said adapter circuits are removed from said subsystem thereby extending the shelf life of said battery circuit means.

2. The system of claim 1 wherein said adapter board further includes another connector means for interconnecting said adapter to an external source, said another connector means including a plurality of pins and conductor circuit means connecting one of said plurality of pins to said one terminal of said battery circuit means enabling the monitoring of the power level of said battery circuit means during the operation of said adapter.

3. The system of claim 2 wherein another one of said another connector pins connects to said first terminal for recharging said battery circuit means to a predetermined voltage level when said adapter circuits are removed from said subsystem.

4. The system of claim 1 wherein said time of day counter means includes:
    a number of binary counter stages connected for storing a time of day value, each stage including a voltage supply terminal;
    a free running crystal controlled clock circuit coupled to said number of binary stages, said clock circuit generating clock signals for updating said time of day value at a millisecond rate; and,
    conductor means connecting each of said counter stages and said clock circuit to said first terminal to be powered by said battery circuits during periods when said voltage supply is disabled so as to continue updating and storage of said time of day value in said binary counter stages.

5. The system of claim 4 wherein said binary counter stages and clock circuit are constructed from CMOS low power circuits.

6. The system of claim 5 wherein said circuit means includes a diode having anode and cathode terminals, said anode terminal being connected to said second pin and said cathode terminal being connected in common with said first terminal so as to power said time of day counter circuit means from said controller supply voltage during normal operations and enable said time of day counter circuits to be powered from said battery circuit means during other than normal operations when said supply voltage is disabled.

7. The system of claim 6 wherein said time of day counter circuit means further includes an output latch register coupled to said number of counter stage for receiving a time of day value therefrom for transfer to said controller, and
    said adapter circuits further including a diode circuit for connecting said supply voltage to said output latch register for powering said register only during normal operations and for enabling said time of day circuits to be powered from said battery circuit means during other than normal operations when said supply voltage is disabled.

8. The system of claim 1 further including a central processing unit coupled to said controller and wherein said adapter circuits further include a microprocessing unit coupled to receive commands from said controller subsystem generated in response to instructions received from said central processing unit, said microprocessing unit being operatively coupled to said time of day counter means for loading said counter means with a time of day value upon connecting said adapter circuits into said controller subsystem.

9. An adapter circuit board for use in a data processing system including a central processing unit and a controller coupled to a common bus, said adapter board being removably connected to said controller for receiving commands from said controller through a controller/adapter interface generated in response to instructions from said central processing unit, said adapter board comprising:
  a low power free running time of day counter circuit means for generating and storing time of day values;
  a plurality of chargeable battery circuits connected in series to provide an auxiliary supply voltage, said battery circuits having first and second output terminals, said first terminal being connected to supply said auxiliary supply voltage and said second terminal being connectable to a ground reference potential;
  a connector having a number of pins for interconnecting said controller and adapter through said interface for operation, a first pin being connected to said second terminal and a second pin being connectable to a supply voltage from said controller adapter interface;
  circuit means connecting said second pin in common with said first terminal for powering said adapter circuits during normal operations; and,
  conductor means connecting said first terminal to said time of day counter circuit means, said battery circuits being enabled to power said time of day counter circuit means only upon connecting said adapter circuits into said controller and said battery circuits being disabled when said adapter circuits are removed from said controller thereby extending the shelf life of said battery circuits.

10. The system of claim 9 wherein said adapter circuit board further includes another connector for interconnecting said adapter to an external source, said another connector including a plurality of pins and conductor circuit means connecting one of said plurality of pins to said one terminal of said battery circuits enabling the monitoring of the power level of said battery circuits during the operation of said adapter.

11. The system of claim 10 wherein another one of said another connector pins connects to said first terminal for recharging said battery circuits to a predetermined voltage level when said adapter circuits are removed from said controller.

12. The system of claim 9 wherein said time of day counter means includes:
  a number of binary counter stages connected for storing a time of day value, each stage including a voltage supply terminal;
  a free running crystal controlled clock circuit coupled to said number of binary stages, said clock circuit generating clock signals for updating said time of day value at a millisecond rate; and,
  conductor means connecting each of said counter stages and said clock circuit to said first terminal to be powered by said battery circuits during periods when said voltage supply is disabled so as to continue updating and storage of said time of day value in said binary counter stages.

13. The system of claim 12 wherein said binary counter stages and clock circuit are constructed from CMOS low power circuits.

14. The system of claim 13 wherein said circuit means includes a diode having anode and cathode terminals, said anode terminal being connected to said second pin and said cathode terminal being connected in common with said first terminal so as to power said time of day counter circuit means from said controller supply voltage during normal operations and enable said time of day counter circuits to be powered from said battery circuits during other than normal operations when said supply voltage is disabled.

15. The system of claim 14 wherein said time of day counter circuit means further includes an output latch register coupled to said number of counter stage for receiving a time of day value therefrom for transfer to said controller, and
  said adapter circuits further including a diode circuit for connecting said supply voltage to said output latch register for powering said register only during normal operations and for enabling said time of day circuits to be powered from said battery circuits during other than normal operations when said supply voltage is disabled.

16. The system of claim 9 wherein said adapter board further includes a microprocessing unit coupled to receive commands from said controller generated in response to instructions received from said central processing unit, said microprocessing unit being operatively coupled to said time of day counter means for loading said counter means with a time of day value upon connecting said adapter circuits into said controller.

17. A data processing system including a central processing unit and a controller coupled to a common bus, said controller including a number of ports, and a corresponding number of adapters each port interconnecting a different one of said number of adapters for operation with said controller, the circuits of said controller being mounted on a mother board and the circuits of each of said number of adapters being mounted on a daughter board so as to be connected with said controller circuits upon installation therein, one of said adapters comprising:
  a low power free running time of day counter circuit means for generating and storing time of day values including:
    a number of binary counter stages connected for storing a time of day value, each stage including a voltage supply terminal; and,
    a free running crystal controlled clock circuit coupled to said number of binary stages, said clock circuit generating clock signals for updating said time of day value at a millisecond rate;
  a plurality of rechargeable battery circuits connected in series to provide an auxiliary supply voltage, said battery circuits having first and second output terminals, said first terminal being connected to supply said auxiliary supply voltage and said second terminal being connectable to a ground reference potential;
  a number of connectors each having a number of pins for interconnecting said controller mother board and adapter daughter board for operation, a pin of one another one of said connectors being connectable to a supply voltage from said controller mother board;

circuit means connecting said pin of said another connector in common with said first terminal for powering said adapter circuits during normal operations; and, conductor means connecting each of said counter stages and said clock circuit to said first terminal to be powered by said battery circuits during periods when said voltage supply is disabled only upon connecting said adapter daughter board to said controller mother board and said battery circuits being disabled when said adapter daughter board is removed from said controller thereby extending the shelf life of said battery circuits.

18. The system of claim 17 wherein a third one of said number of connectors interconnects said adapter board to an external source and conductor circuit means connecting one of said plurality of pins of said third connector to said one terminal of said battery circuits enabling the monitoring of the power level of said battery circuits.

19. The system of claim 18 wherein another one of said third connector pins connects to said first terminal for recharging said battery circuits to a predetermined voltage level when said adapter board is removed from said controller.

20. The system of claim 17 wherein said binary counter stages and clock circuit are constructed from CMOS low power circuits.

21. The system of claim 20 wherein said circuit means includes a diode having anode and cathode terminals, said anode terminal being connected to said pin of said another connector and said cathode terminal being connected in common with said first terminal so as to power said time of day counter circuits from said controller supply voltage during normal operations and enable said time of day counter circuits to be powered from said battery circuits during other than normal operations when said supply voltage is disabled.

22. The system of claim 20 wherein said time of day counter circuit means further includes an output latch register coupled to said number of counter stage for receiving a time of day value therefrom for transfer to said controller, and said adapter circuits further including a diode circuit for connecting said supply voltage to said output latch register for powering said register only during normal operations and for enabling said time of day circuits to be powered from said battery circuits during other than normal operations when said supply voltage is disabled.

23. The system of claim 17 wherein said adapter circuits further include a microprocessing unit coupled to receive commands from said controller generated in response to instructions received from said central processing unit, said microprocessing unit being operatively coupled to said time of day counter means for loading said counter stages with a time of day value upon connecting said adapter board to said controller.

* * * * *